Nov. 22, 1966     L. A. GRUENEWAELDER     3,286,400

MEANS AND METHODS FOR TREE SURGERY

Filed April 22, 1964     2 Sheets-Sheet 1

INVENTOR.
LOU A. GRUENEWAELDER
BY
Alfred W Petchaft
ATTORNEY

INVENTOR.
LOU A. GRUENEWAELDER

United States Patent Office

3,286,400
Patented Nov. 22, 1966

3,286,400
MEANS AND METHODS FOR TREE SURGERY
Lou A. Gruenewaelder, 6917 Pershing Ave.,
University City, Mo.
Filed Apr. 22, 1964, Ser. No. 361,704
10 Claims. (Cl. 47—8)

This invention relates in general to certain new and useful improvements in means and methods for tree surgery and, more particularly, to a foam-type filler which can be injected into tree cavities which result from disease or injury.

When trees reach maturity, they tend to become more susceptible to diseases and forms of injury which may unnecessarily shorten their life spans. Since most of many decorative trees have been destroyed during the last century, many preventive measures have been employed to preserve such trees. For example, in an effort to control the spread of decay caused by insects, bacteria, and fungi, it is current practice among tree surgeons to clean out the decayed or rotted wood fibers and fill the cavities with tar, oil, or concrete. Up to the present time, no truly adequate method of patching cavities has been discovered since the materials which have been used are rigid and thus have a tendency to crack, thereby allowing air and moisture to infiltrate into the cavity and contribute to further decay.

It is the primary object of the present invention to provide novel means and methods for tree surgery which are simple, economical, and highly effective in arresting decay or disease in the woody portions of the tree trunk and major branches.

It is an additional object of the present invention to provide a filler for three cavities that is somewhat flexible and is, therefore, capable of expanding or contracting as the size of the cavity varies due to natural movements and changes in the tree.

It is also an object of the present invention to provide a filler for tree cavities of the type stated which possesses fungicidal, bactericidal, and parasiticidal properties.

It is a further object of the present invention to provide a filler for tree cavities of the type stated which is economical to manufacture and apply.

It is another object of the present invention to provide a filler for tree cavities that will not wash off.

It is still another object of the present invention to provide novel materials for cleaning the cavity which possess fungicidal, bactericidal, and parasiticidal properties.

It is an additional object of the present invention to provide a tree cavity filler which will improve the appearance of the trees which have been thus treated.

It is still another object of the present invention to provide a tree cavity filler which will prevent the entrance of fungus spores.

It is also an object of the present invention to provide a tree cavity filler which will form a support for weakened branches.

It is an additional object of the present invention to provide a tree cavity filler for preventing the haboring of insects.

It is another object of the present invention to provide a tree cavity filler for retarding the spread of certain fungi by excluding air.

With the above and other objects in view, my invention resides in the novel features of form, construction, arrangement, and combination of parts presently described and pointed out in the claims.

In the accompanying drawings—

Figure 1:
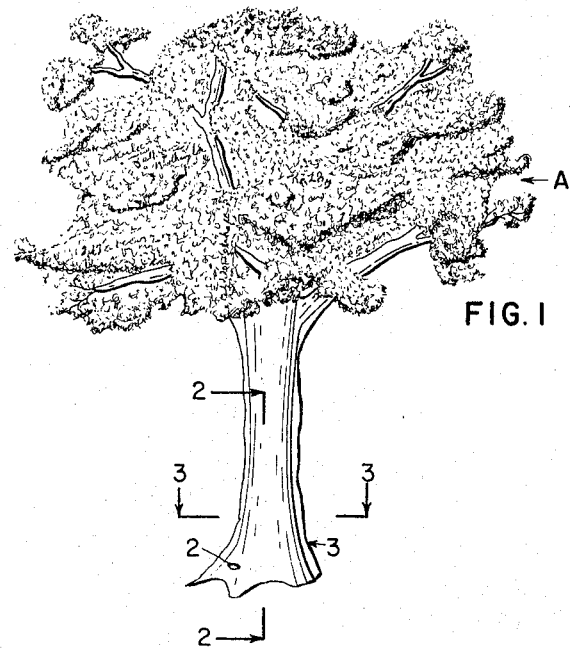
FIG. 1 is a perspective view of a tree having a cavity opening adjacent to its base.
Figure 2:
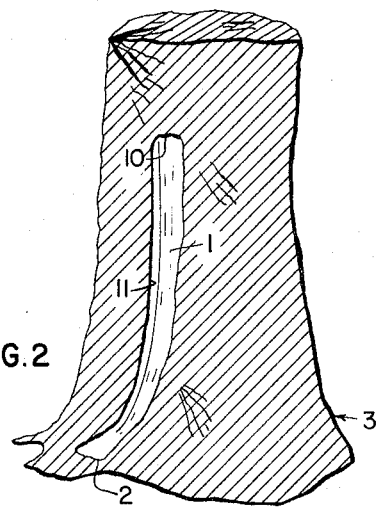
FIG. 2 is a fragmentary sectional view taken along line 2—2 of FIG. 1.
Figure 3:
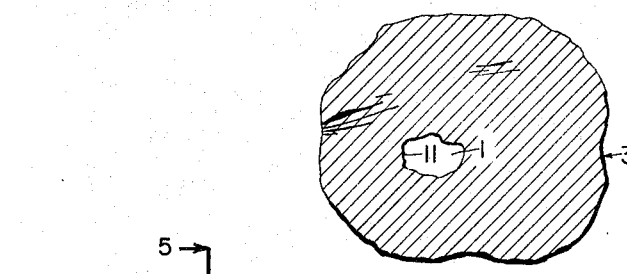
FIG. 3 is a sectional view taken along line 3—3 of FIG. 1.

Referring now in more detail and by reference characters to the drawings which illustrate a preferred embodiment of the present invention, A designates a tree having a cavity 1, said cavity 1 having an aperture 2 which is ordinarily located in the vicinity of the base 3. It should be noted that when borers or other insects enter a tree, they do so above the ground level and tend to work in an upward direction so that the aperture 2 will be above the ground level. The borers after entering the aperture 2 then work upwardly and inwardly for relative great distances.

Figure 4:
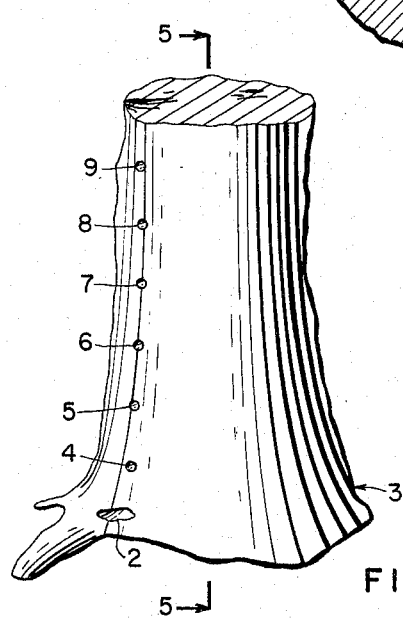
FIG. 4 is a fragmentary perspective view of the area of the tree containing the cavity.
Figure 5:
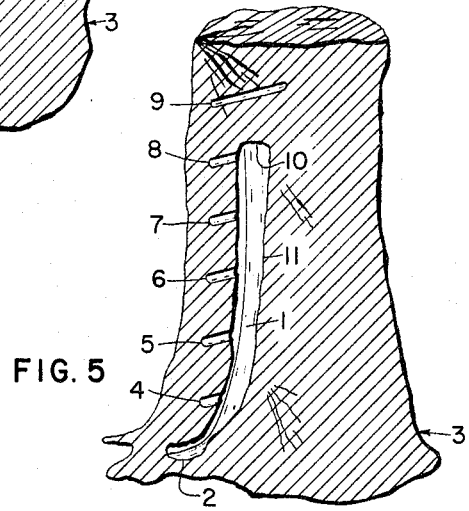
FIG. 5 is a sectional view taken along line 5—5 of FIG. 4.

After observing the aperture 2, the extent of the cavity 1 may be determined by merely drilling spaced holes 4, 5, 6, 7, 8, and 9, into the tree A as shown in FIGS. 4 and 5, until the top 10 of the cavity 1 is located. The position of the top 10 is located by merely drilling holes in an upward direction until the drill (not shown) does not break through an inner wall 11 of the cavity 1, as occurred when drilling holes 4, 5, 6, 7, and 8. It is also possible, if desired, to determine the lateral extent of the cavity by drilling a few additional holes (not shown) on either side of the line of holes shown in FIGS. 4 and 5. It should be noted that the diameter of the holes 4, 5, 6, 7, 8, and 9 can vary, depending upon the size of the tree A, but should be in the order of around one inch and spaced from each other at a distance which will facilitate cleaning of the cavity 1.

Figure 6:
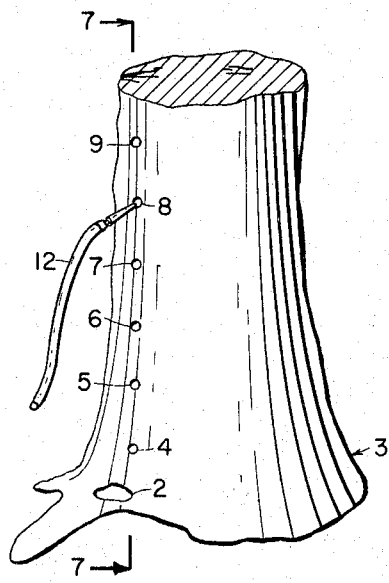
FIG. 6 is a fragmentary perspective view of the area of the tree containing the cavity.
Figure 7:
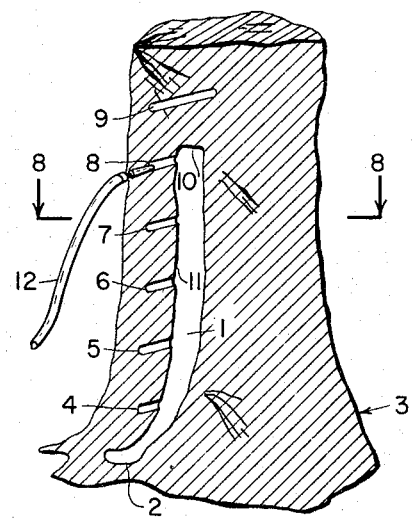
FIG. 7 is a sectional view taken along line 7—7 of FIG. 6.
Figure 9:
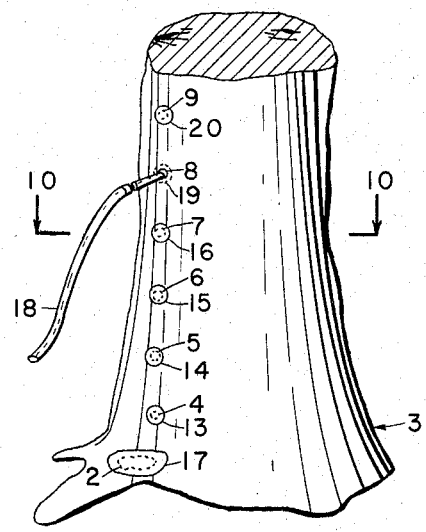
FIG. 9 is a fragmentary perspective view of the area of the tree containing the cavity with a foam delivery hose attached.
Figure 8:
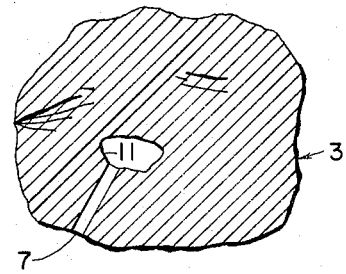
FIG. 8 is a sectional view taken along line 8—8 of FIG. 7.
Figure 10:
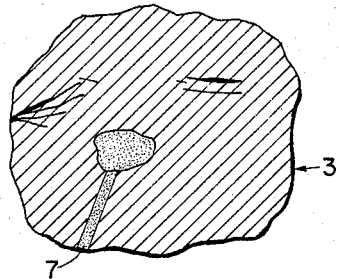
FIG. 10 is a sectional view taken along line 10—10 of FIG. 9.

After establishing the location and extent of the cavity 1, an insecticide hose 12 which is connected to an insecticide tank (not shown) is inserted into the hole 8 as shown in FIGS. 6 and 7. The cavity 1 is then flushed with a solution of bactericides, fungicides, and insecticides such as quaternary ammonium compounds, chlorobutanol, and sodium phenolsulfonate. This flushing process is continued until the liquid flowing out of the aperture 2 is devoid of foreign material.

Small circular patches 13, 14, 15, and 16 are then placed over the holes 4, 5, 6, and 7, and cemented to the tree A by means of a suitable adhesive. A patch 17 which is tailored to cover the aperture 2 is also cemented to the tree A by means of a suitable adhesive. These patches 13, 14, 15, 16, and 17 are composed of synthetic resins such as black polyethylene, polystyrene, and polyamide. In compounding the aforementioned organic materials, active bactericides, fungicides, and insecticides are added such as nicotine extract, quaternary ammonium compounds, pyrethrum extract, chlorobutanol, activated carbon, sulfur, calcium cyanide, carbon bisulfide, and mercuric chloride, which can be formulated for specific applications.

A hose 18 is then inserted into the hole 8 and a fluid foam of a synthetic resin such as polyurethane vinyl chloride, polystyrene, or the like, is injected into the cavity 1. It should be noted that a certain amount of judgment must be exercised in determining the amount of fluid foam to be used since it will expand into a foam that is many times its original volume. After the cavity 1 is completely filled with the foam, the hose 18 is then inserted into the hole 9 in order to fill it with foam. At this point, patches 19, 20, are placed over the holes 8, 9, and also cemented to the tree A by means of a suitable adhesive.

As previously mentioned, either polyurethane, vinyl chloride, or polystyrene foam may be used for filling the cavity 1. In preparing these foams, insecticides, bactericides, and fungicides such as the quaternary ammonium compounds, dimethyl silicone, sulfur, and chlorobutanol are added to the fluid foam in addition to activated carbon. Two percent to five percent by weight of the quaternary ammonium compounds act as highly effective fungicides and have the property of destroying macro and micro organisms such as airborne bacteria.

Among the quaternary ammonium compounds which can be used in the present invention are dodecyl dimethyl benzyl ammonium naphthenate, cetyl dimethyl benzyl ammonium naphthenates, alkyl dodecyldimethyl benzyl ammonium chloride, 9-octadecenyl dimethyl ethyl ammonium naphthenate, tetraethyl ammonium naphthenate, dimethyl ethyl propyl ammonium naphthenate, N (lauric acid ester of colamino-formyl methyl) dimethyl ammonium naphthenate, and N-alkylbenzyl trimethyl ammonium naphthenates, such as N-dodecylbenzyl trimethyl ammonium naphthenate. One of the most useful and practical quaternary ammonium compounds and the one found preferable for the present invention is di-isobutyl phenoxy ethyl dimethyl benzyl ammonium chloride monohydrate. Thus, when fluid foam is cured, the insecticides, bactericides, and fungicides will be completely and homogeneously dispersed therein and the cells of the cavity filler will provide the cavity 1 with active protection against living organisms and insects.

In addition to filling cavities within trees, polyurethane, polystyrene, and vinyl chloride foam can be used in conjunction with wounds that are made when pruning live branches from the tree. This necessitates only the spraying of polyurethane, polystyrene, or vinyl chloride fluid foam onto such wounds and allowing it to harden and then spraying a polyethylene film containing the above-mentioned insecticides and chemicals over the foam, which will act as an adhesive and thereby retain said foam in place. It should be noted that the wound can be treated by an alternate method which entails merely spraying with the polyurethane, polystyrene, or vinyl chloride foam and deleting the spray of polyethylene film. The advantage in these methods of treating a pruning wound lies in the fact that air cannot circulate into the wound which prevents it from being attacked by fungi, bacteria, and insects. The polyurethane, polystyrene, and vinyl chloride foams act as a bandage which also kills bacteria and any insect life which may attempt to attack the tree at this weak point. For commercial convenience, the polyurethane, polystyrene, and vinyl chloride foam will be packaged in liquid form in spray cans which contain the aforementioned chemicals, so that the ordinary home owner may fill cavities, patch areas where the bark has been removed, cover weak crotches, and in general perform home surgery on trees and other forms of plant life. In addition, the polyethylene, polystyrene, polyamide, will be packaged in spray cans and will contain the bactericides, fungicides, and insecticides that were incorporated into the patches.

It should be understood that changes and modifications in the form, construction, arrangement, and combination of the several parts of the means and methods for tree surgery may be made and substituted for those herein shown and described without departing from the nature and principle of my invention.

Having thus described my invention, what I claim and desire to secure by Letters Patent is:

1. The method of performing tree surgery on cavities which result from disease or injury, said method comprising locating the cavity opening, drilling small holes in the tree to determine the extent of the cavity, washing the cavity with a solution of insecticides, fungicides, and bactericides, injecting into the cavity a fluid foam containing insecticides, fungicides, and bactericides, allowing the foam to fill the cavity and solidify, and cementing patches containing insecticides, fungicides, and bactericides over the cavity opening and the small holes thereby sealing the filled cavity.

2. The method of performing tree surgery on cavities which result from disease or injury, said method comprising locating the cavity opening, drilling small holes in the tree to determine the extent of the cavity, washing the cavity with a solution of insecticides, fungicides and bactericides, injecting into the cavity a fluid foam of synthetic resin containing insecticides, fungicides and bactericides, allowing the foam to fill the cavity and solidify, and cementing patches containing insecticides, fungicides and bactericides over the cavity opening and the small holes thereby sealing the filled cavity.

3. The method of performing tree surgery on cavities which result from disease or injury, said method comprising locating the cavity opening, drilling small holes in the tree to determine the extent of the cavity, washing the cavity with a solution of insecticides, fungicides, and bactericides, such as the quaternary ammonium compounds chlorobutanol and sodium phenol sulfonate, injecting into the cavity a fluid foam containing insecticides, fungicides, and bactericides, allowing the foam to fill the cavity and solidify, and cementing patches containing insecticides, fungicides, and bactericides over the cavity opening and the small holes thereby sealing the filled cavity.

4. The method of performing tree surgery on cavities which result from disease or injury, said method comprising locating the cavity opening, drilling small holes in the tree to determine the extent of the cavity, washing the cavity with a solution of insecticides, fungicides and bactericides, injecting into the cavity a fluid foam of polyurethane containing insecticides, fungicides and bactericides, allowing the foam to fill the cavity and solidify, and cementing patches of black polyethylene containing insecticides, fungicides, and bactericides over the cavity opening and the small holes thereby sealing the filled cavity.

5. The method of performing tree surgery on cavities which result from disease or injury, said method comprising locating the cavity opening, drilling small holes in the tree to determine the extent of the cavity, washing the cavity with a solution of insecticides, fungicides and bactericides, injecting into the cavity a fluid foam of vinyl chloride containing insecticides, fungicides and bactericides, allowing the foam to fill the cavity and solidify, and cementing patches of polyamide containing insecticides, fungicides and bactericides over the cavity opening and the small holes thereby sealing the filled cavity.

6. The method of performing tree surgery on cavities which result from disease or injury, said method comprising locating the cavity opening, drilling small holes in the tree to determine the extent of the cavity, washing the cavity with a solution of insecticides, fungicides and bactericides, injecting into the cavity a fluid foam of polystyrene containing bactericides, fungicides and insecticides, allowing the foam to fill the cavity and solidify, and cementing patches of polystyrene containing insecticides, fungicides and bactericides over the cavity opening and the small holes thereby sealing the filled cavity.

7. The method of performing tree surgery on cavities which result from disease or injury, said method comprising locating the cavity opening, drilling small holes in the tree to determine the extent of the cavity, washing the cavity with a solution of insecticides, fungicides and bactericides, injecting into the cavity a fluid foam of synthetic resin having the quaternary ammonium compounds dimethyl silicone, sulfur, activated carbon and chlorobutanol dispersed therein, allowing the foam to fill the cavity and solidify, and cementing patches of synthetic resin containing insecticides, fungicides and bactericides over the cavity opening and the small holes thereby sealing the filled cavity.

8. The method of performing tree surgery on cavities which result from disease or injury, said method comprising locating the cavity opening, drilling small holes in the tree to determine the extent of the cavity, washing the cavity with a solution of insecticides, fungicides and bactericides, injecting into the cavity a fluid foam of synthetic resin having the quaternary ammonium compounds dimethyl silicone, sulfur, activated carbon and chlorobutanol dispersed therein, allowing the foam to fill the cavity and solidify, and cementing patches of synthetic resin having nicotine extract, quaternary ammonium compounds, pyrethrum extract, chlorobutanol, activated carbon, sulfur, calcium cyanide, carbon bisulfide and mercuric chloride over the cavity opening and the small holes thereby sealing the filled cavity.

9. The method of performing tree surgery on cavities which result from disease or injury, said method comprising locating the cavity opening, drilling small holes in the tree to determine the extent of the cavity, washing the cavity with a solution of insecticides, fungicides and bactericides, injecting into the cavity a fluid foam of synthetic resin having 2% to 5% by weight of a quaternary ammonium compound dispersed therein, allowing the foam to fill the cavity and solidify, and cementing patches of synthetic resin having 2% to 5% by weight of a quaternary ammonium compound dispersed therein over the cavity opening and the small holes, thereby sealing the filled cavity.

10. The method of performing tree surgery on cavities which result from disease or injury, said method comprising locating the cavity opening, drilling small holes in the tree to determine the extent of the cavity, washing the cavity with a solution of insecticides, fungicides and bactericides, injecting into the cavity a fluid foam of synthetic resin having 2% to 5% by weight of a quaternary ammonium compound compounded therein, allowing the foam to fill the cavity and solidify, and cementing patches of synthetic resin having 2% to 5% by weight of a quaternary ammonium compound compounded therein over the cavity opening and the small holes, thereby sealing the filled cavity.

References Cited by the Examiner
UNITED STATES PATENTS 2,051,840  8/1936  Gerhart _____ 47—8
2,258,693  10/1941  Van Yahres _____ 47—8

ABRAHAM G. STONE, *Primary Examiner.*

R. E. BAGWILL, *Assistant Examiner.*